United States Patent [19]

Landis et al.

[11] Patent Number: 5,588,148
[45] Date of Patent: *Dec. 24, 1996

[54] METHOD FOR MANAGING DATA TRANSFER BETWEEN COMPUTING DEVICES

[75] Inventors: Michael R. Landis; Anthony J. Yeates, both of Cary; Thomas J. Gavin, Arlington Heights, all of Ill.

[73] Assignee: Motorola, Inc., Schaumburg, Ill.

[ * ] Notice: The term of this patent shall not extend beyond the expiration date of Pat. No. 5,490,088.

[21] Appl. No.: 301,374

[22] Filed: Sep. 6, 1994

[51] Int. Cl.$^6$ .................................................... G06F 17/30
[52] U.S. Cl. ........................... 395/601; 364/DIG. 2; 364/962.4; 364/975.1
[58] Field of Search .................................. 395/600, 200, 395/700; 364/DIG. 1, DIG. 2; 379/89

[56] References Cited

U.S. PATENT DOCUMENTS

| | | | |
|---|---|---|---|
| 4,882,765 | 11/1989 | Maxwell et al. | 455/18 |
| 5,210,751 | 5/1993 | Onoe et al. | 370/94.1 |
| 5,321,603 | 6/1994 | Schwenke | 364/146 |
| 5,323,388 | 6/1994 | Chang et al. | 370/60 |
| 5,394,460 | 2/1995 | Olson et al. | 379/67 |
| 5,430,710 | 7/1995 | Mueller et al. | 370/16 |
| 5,432,798 | 7/1995 | Blair | 371/32 |

*Primary Examiner*—Thomas G. Black
*Assistant Examiner*—Maria N. Von Buhr
*Attorney, Agent, or Firm*—Andrew S. Fuller

[57] ABSTRACT

A method is provided for managing data transfer between computing devices. A message received identifies a particular data set and a client profile (410). When the particular data set represents a complete data set, this fact is confirmed (420,425,430). When the particular data set does not represent the complete data set, the client profile is used to determine whether to transmit additional data to complete the particular data set, or whether to transmit the complete data set to replace the particular data set (420,425,440).

13 Claims, 4 Drawing Sheets

300

METHOD FOR MANAGING DATA TRANSFER BETWEEN COMPUTING DEVICES

TECHNICAL FIELD

This invention relates in general to data transfer between computing devices, including but not limited to data transfers between remotely situated computing devices.

BACKGROUND OF THE INVENTION

In many applications, access is required to centrally stored information by computing devices at remote sites. In one example, there is a need to retrieve the most current information from a central database for presentation at a remote site. Communications between the central database and the remote site can be quite complicated if there are many remote sites attempting to access the central database concurrently. One popular approach for managing these communications is the use of a client/server model for data distribution. The data server interfaces with the central database to provide orderly access to the data by data clients at the remote sites. Thus, a client needing information from the central database makes a request to the database server, and the database server responds to the client with the information sought.

There are some problems which arise in the server/client model, which are particularly acute when the remote sites are connected through a wireless communication link. One such problem is the general limited transmission capacity for communications between the server and the client. This problem is magnified when the amount of data transferred is relatively large, and data requests are frequent in order to keep information current at the remote site for a critical application. For example, consider a remote client in the form of a wireless computing device which maintains and presents graphical images to an operator. The presentation of images typically requires large quantities of data. If the image data must always be kept fairly current, information must be transferred from the central database to the computing device. However, the data transmission capacity of the communication link between the client and the server places an upper limit on the quantity of data which may be transferred within a specific time period. Thus, there is a need to minimize the amount of data transmitted.

Many prior art solutions focus on the efficient and timely transfer of information between a centrally located data server and a remote client. Some prior art solutions focus on data compression. Data compression seeks to condense information, usually by removing useless repetition of data, such that the total amount of information transferred is reduced. Another focus is on the provision of more high speed transmission capacity. By increasing the data transmission rate, the total time required to transfer information from the server to the client is reduced.

There has been an increase in the use of wireless communication devices, for the presentation of images, or other types of documents to an operator. Many applications require the transfer of large quantities of data. Computation and/or storage capabilities may differ depending on the type of device available to the operator. For example, in one case, the operator may be interfacing directly to a powerful work station. In another case, the operator may be using a less powerful hand-held computing device. Differences also exist for the data transmission links between computing devices. There exists a need to provide an improved methodology for managing data transfer between computing devices in this environment.

DETAILED DESCRIPTION OF THE PREFERRED EMBODIMENT

Figure 1:
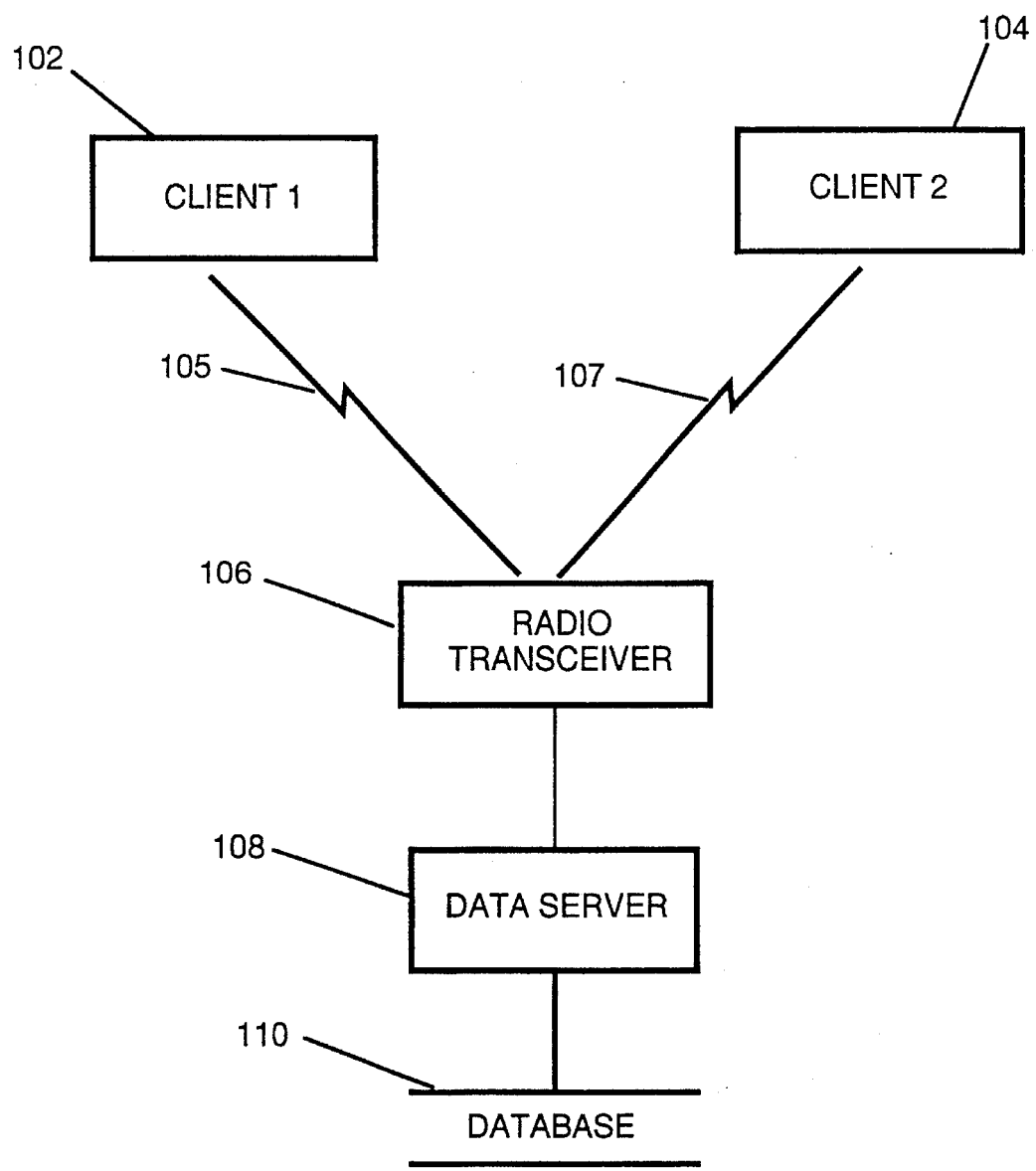
FIG. 1 is a block diagram of a data communication system configured in accordance with the present invention.

While the specification concludes with claims defining the features of the invention that are regarded as novel, it is believed that the invention will be better understood from a consideration of the following description in conjunction with the drawing figures, in which like reference numerals are carried forward.

Generally, this invention provides a method for managing data transfer between computing devices. Ordinarily a server/client relationship is established between the computing devices. A server is an interface process, implemented on a computing device, which provides controlled access to a database or data repository. The data server retrieves and transfers data to a client in response to a client request. The invention recognizes that the data transfer process can be significantly enhanced by maintaining preferences at the server location, or by communicating preferences in the request for data to the server. The server uses the information available about the client to determine the optimal means for fulfilling the client's request. As a result, it may be possible to reduce the amount of data sent to the client, or the total time or costs associated with data transmission.

Referring now to FIG. 1, a block diagram of a data communication system is shown, in accordance with the present invention. The data communication system has a central data server 108 and remote data clients 102, 104 coupled by a radio transceiver 106 through communication links 105, 107. The data communication system includes a database 110 in which information is stored which is needed to properly support the data clients 102, 104. The type of data stored in the database 110 depends on the type of data required by the data clients. In the preferred embodiment, the data stored includes raster formatted graphical images. The database 110 may be organized using hierarchical file system, a relational database system, or any suitable data organization scheme. Preferably, the database 110 is implemented using a database management system on a computing device such as a Unix workstation or an industry standard Personal Computer. Clients 102, 104 retrieve data from the database 110 through the data server 108 to use in their applications. Clients 102, 104 differ in requirements and capabilities and thus may require different responses from the server 108.

In the preferred embodiment, the data clients 102, 104 are computing devices which are remotely situated. A data client 102, 104 may utilize the information from the data server 108 in a variety of ways. For example, the data client 102, 104 may use the data received from the server 108 to present a displayed image to an operator. The client 102, 104 can be implemented using a personal computer such as a notebook computer, a personal digital assistant, or a personal intelligent communicator. When data is transferred from the server 108, the data client 102, 104 may store all, some, or none of the data locally. When the data client 102, 104 stores some or all of the transferred data locally, it is usually necessary to periodically update this locally stored data. In the preferred embodiment, the data client 102, 104 operates to present an operator with transparent access to data. The data client 102, 104 communicates with the data server 108 as needed to retrieve and provide current information to the application being utilized by the data client 102, 104.

The data server 108 provides access to the database 110 which contains information needed by the data clients 102, 104. The information stored in the database 110 which is required by the data client 102, 104 may comprise several documents or files. A document typically consists of one or more files. A complete data set is defined as the latest version of information stored on the data server 108 that is needed by the data client 102, 104 for a particular application. The data client 102, 104 may query the data server 108 to retrieve the latest information, i.e., the complete data set, which is stored in the database 110. Upon receiving a request, the server 108 determines the information which would form the best response to the client's request, and transfers that information to the client 102, 104.

The communication link between data clients 102, 104 and the data server 108 provides a path for the transmission of requests for data and for the corresponding response. The communication link may be an established local area network, a temporary link (such as by telephone), or a wide area network. Additionally the communication link may be wire or wireless. In the preferred embodiment, communication links 105, 107 are established over a wireless network and includes the use of the radio transceiver 106. The communication link is one of several limited resources used in supporting data transfers between the server 108 and a client 102, 104. The present invention provides a protocol for managing data transfer between the data server 108 and data clients 102, 104 which takes into account the availability of communication, data storage, and computing resources of the data client 102, 104. The protocol incorporates the use of a client profile which defines preferences, capabilities, configuration and other parameters which may affect data transfer between the server and client. Generally, the data client 102, 104 provides identification information for a particular data set in a request message to the data server 108. Using the identification information, the data server 108 retrieves the particular data set identified, and effects the data transfer according to the client profile, if any.

Figure 2:
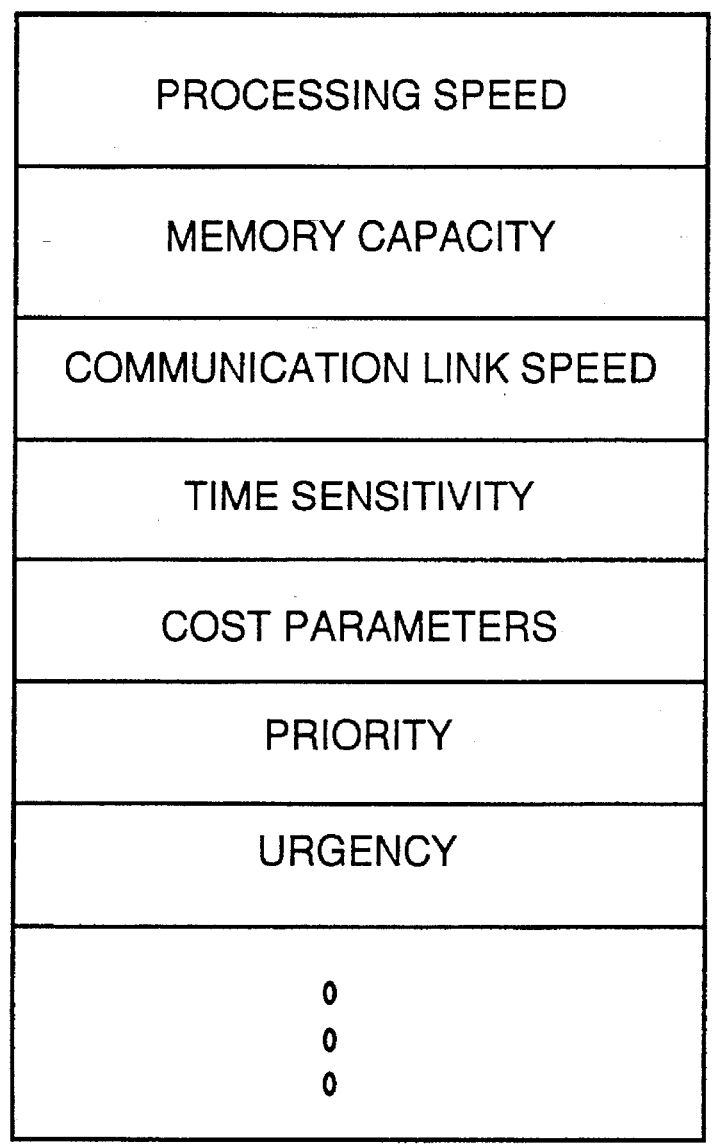
FIG. 2 shows a summary of a client profile accessible to the data server, in accordance with the present invention.

FIG. 2 shows a summary of a client profile 200 accessible to the data server. The profile 200 is a collection of variables including characteristics of the client which can be used by the server 108 to optimize transmission costs, time, and reliability based on the client's computing and storage capabilities, client preferences, and other client response parameters. In the preferred embodiment, the client profile 200 has information on client processing speed, available memory, communication link speed, response time sensitivity, cost sensitivity, and an urgency indicator. The profile 200 may also contain information on priority, preferred compression techniques, secondary storage characteristics, such as latency, capacity, and transfer rate for each device available. Billing method and units may be included to enable comparisons between data transfer options when cost is a primary concern. For example, radio communication and cellular telephone systems can charge based on a total elapsed time from linking initiation to link tear down and/or by the total number of data packets sent. The method of billing can be used to determine the most cost-effective way to process information both at the client and server locations. In the preferred embodiment, each client 102, 104 has a profile 200 that contains system parameters that optimize the use of network, or tailors the format or character of information supplied from the server 108 in response to client requests. Client profile parameters are grouped in a hierarchical fashion to facilitate configuration.

Figure 3:
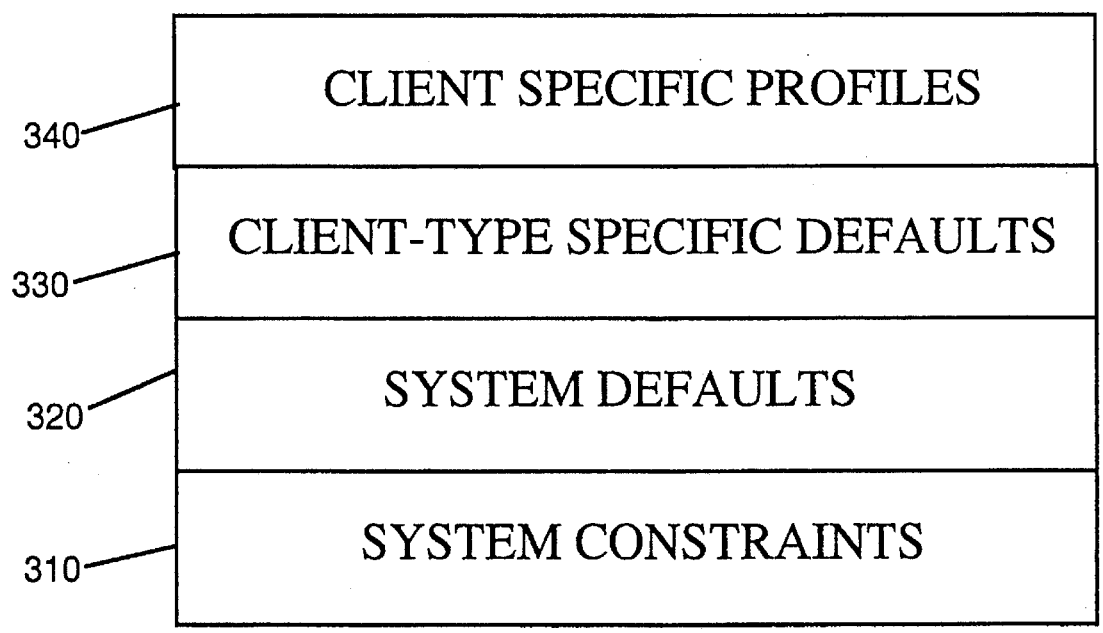
FIG. 3 shows a typically client profile hierarchy, in accordance with the present invention.

Referring to FIG. 3, a typically client profile hierarchy 300 is shown. At the first or lowest level 310, there are basic system constraints. Basic system constraints relate to hardware/software constraints, and constraints on the system which are imposed externally. At a second level 320, there are system defaults. System defaults apply globally throughout the system. At a third level 330, the are client-type specific defaults, and at a fourth level 340, there are client specific profiles. A client's profile is determined by a combination of these parameters in a particular order of precedence. Preferably, the client profile data is stored both at the client and at the server locations. Client type profiles and client's specific profiles are created only when specific deviations from the norm are needed, i.e., system defaults are sufficient. Client type profiles may be generated by a system administrator when client types are introduced which have a need for one or more variances from the system defaults. Client specific profiles would be typically generated by operators or others having control over the clients when client needs are different from system defaults or the applicable client-type profile, if present. The profile information at the various levels correspond to the client profile parameters described above.

Figure 4:
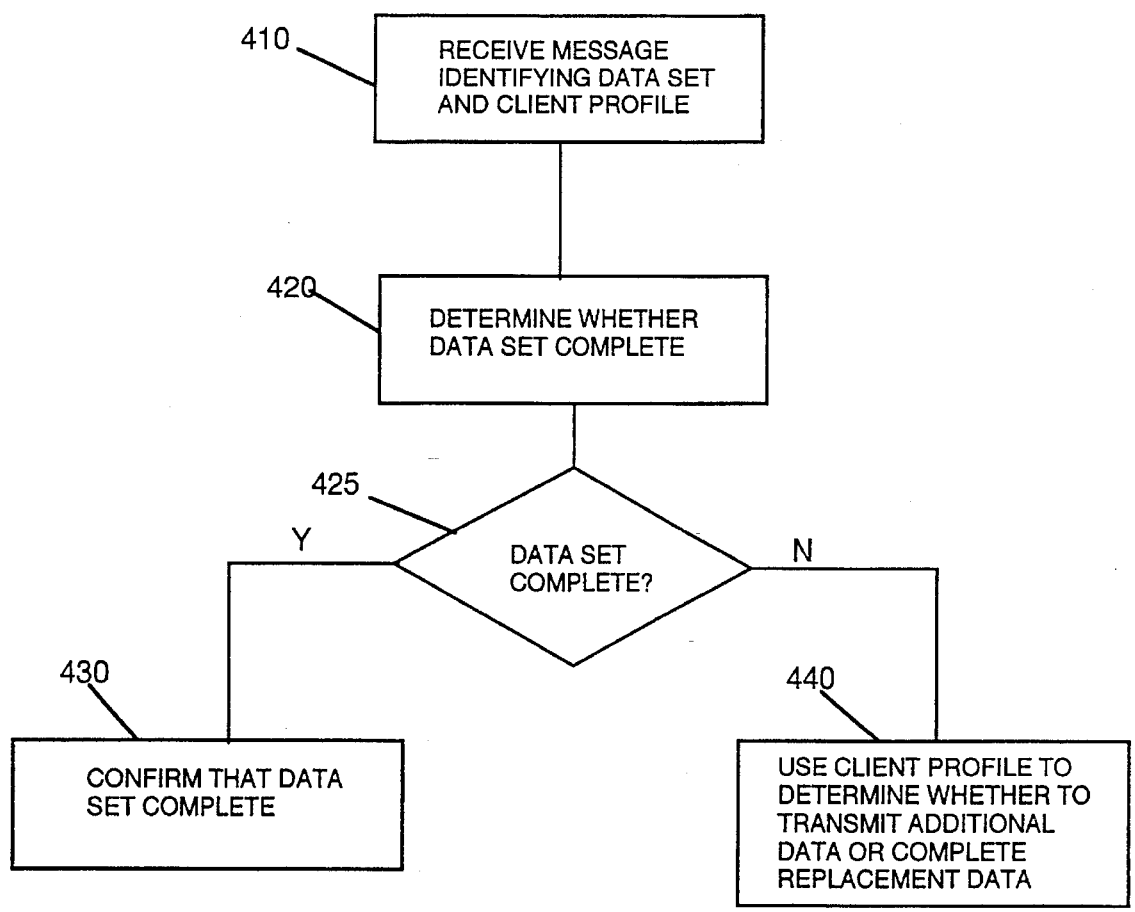
FIG. 4 shows a summary of procedures used to respond to a request from a data client, in accordance with the present invention.

FIG. 4 shows a summary of the procedures 400 used to respond to a request from a data client 102, 104. The data server 108 receives a message from the data client 102, 104 which at least identifies a particular data set, step 410. Preferably, the message also identifies or provides client profile data, if any, and may include other significant information as well. Note that the message may be received in multiple segments. If profile data is included, the client profile information accessible by the server 108 is updated. The server 108 then determines whether the particular data set identified by the message represents a complete data set, stop 420. In making this determination, the server 108 may rely on additional information present in the client request, such as a version number, or the database 110 may contain information specifically identifying the status of data at the data client 102, 104. The server 108 determines whether the particular data set constitutes the latest and complete version. When the particular data set does represent a complete data set, the server 108 responds with information confirming that the particular data set represents a complete data set, steps 425,430. However, when the particular data set does not represent a complete data set, the server 108 determines whether to transmit a complete data set or some additional data to facilitate the formation of a complete data set, stops 425, 440.

The type of data transferred and method of data transfer depends on the information contained in the client profile. The server 108 uses the client profile to determine whether to transmit additional data to complete the particular data set, or a complete data set to replace the particular data set. For example, the client profile of the preferred embodiment contains preference information on the time constraints on responses to data requests and client memory capacity.

When time constraint information is provided in the client profile, the server 108 determines the time required to transmit the additional data and to reconstruct the complete data set using the additional data, with the time required to transmit the complete data set. The server 108 compares these times to determine whether to transmit the additional data or the complete data set. When memory capacity information is provided in the client profile, the server 108 determines the amount of memory required to transmit the additional data and to reconstruct the complete data set using the additional data, with the amount of memory required to transmit the complete data set. The server 108 compares these memory amounts to determine whether to transmit the additional data or the complete data set. Other combinations of the parameters and transfer options are contemplated. For example, in one embodiment, the server 108 has the option of choosing between the complete data set, and two or more sets of additional data which require different reconstruction methodologies depending on the parameters present for the client profile. In such case, the server 108 determines the amount of time required, or the amount of memory required, for transmitting and/or reconstructing data to make current and complete the information stored at the data client 102, 104. The server 108 then compares these amounts to determine the appropriate data transfer option.

The present invention provides for a method of managing data transfers between computing devices using client profile definitions. The data server 108 uses the client profile to determine appropriate responses to a client's request for information. The server 108 bases data transmission decisions on the capabilities of the client, and available communication links between the server 108 and the client. The client profile may be updated or overridden in the message requesting client data. This approach to data transfer management provides much flexibility in handling different types of data clients. For example, if the client has limitations on memory, data processing, or storage capabilities, much of the data processing and reconstruction needed to present current and complete data may be performed at the server 108. However, if the communication link is a limiting factor, such as to cost, capacity, or availability, an effort is made to reduce the amount of data transferred by selecting from among options for making the data at the client current and complete. Thus, by matching client capabilities to data transfer options, a more efficient use of communication and computation resources can be accomplished.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method, comprising the steps of:
    receiving a message identifying a particular data set and a client profile;
    determining whether the particular data set represents a complete data set;
    confirming that the particular data set represents the complete data set, when the particular data set does represent the complete data set; and
    using the client profile to determine whether to transmit additional data to complete the particular data set, or the complete data set to replace the particular data set, when the particular data set does not represent the complete data set.

2. The method of claim 1, further comprising the step of providing preference information regarding time constraints as part of the client profile.

3. The method of claim 2, wherein the step of using the client profile comprises the step of:
    determining a first amount of time that will be required to transmit the additional data and to reconstruct the complete data set using the additional data;
    determining a second amount of time that will be required to transmit the complete data set; and
    comparing at least the first amount of time against the second amount of time to determine whether to transmit the additional data or the complete data set.

4. The method of claim 1, further comprising the step of providing preference information regarding memory capacity as part of the client profile, and wherein the step of using the client profile comprises the step of:
    determining a first amount of memory that will be required to store and to reconstruct the complete data set using the additional data;
    determining a second amount of memory that will be required to store the complete data set; and
    comparing at least the first amount of memory against the second amount of memory to determine whether to transmit the additional data or the complete data set.

5. A method for managing data transfer between computing devices, comprising:
    receiving a message identifying a particular data set and a client profile;
    determining whether the particular data set represents a complete data set;
    confirming that the particular data set represents the complete data set when the particular data set does represent the complete data set; and
    using the client profile, when the particular data set does not represent the complete data set, to determine when to transmit one of:
        a first set of additional data to complete the particular data set;
        a second set of additional data to complete the particular data set, which second set is different from the first set; and
        the complete data set to replace the particular data set.

6. The method of claim 5, further comprising the step of providing preference information regarding time sensitivity as part of the client profile, and wherein the step of using the client profile includes the steps of:
    determining at least a first amount of time that will be required to transmit the first set of additional data and to reconstruct the complete data set using the first set of additional data;
    determining at least a second amount of time that will be required to transmit the second set of additional data and to reconstruct the complete data set using the second set of additional data;
    determining at least a third amount of time that will be required to transmit the complete data set; and
    comparing the first amount of time, the second amount of time, and the third amount of time to determine whether to send the first or second set of additional data, or the complete data set.

7. The method of claim 5, further comprising the step of providing preference information regarding memory capacity as part of the client profile, and wherein the step of using the client profile includes the steps of:

determining at least a first amount of memory that will be required to store the first set of additional data and to reconstruct the complete data set using the first set of additional data;

determining at least a second amount of memory that will be required to store the second set of additional data and to reconstruct the complete data set using the second set of additional data;

determining at least a third amount of memory that will be required to store the complete data set; and comparing the first amount of memory, the second amount of memory, and the third amount of memory to determine whether to send the first or second set of additional data, or the complete data set.

8. A method for managing data transfer between first and second computing devices, comprising the steps of at the first computing device:

receiving a message from the second computing device identifying a particular data set, and identifying a client profile characterizing the second computing device;

determining whether the particular data set represents a complete data set; and using the client profile to determine a transmission preference for communication with the second computing device;

transferring data to the second computing device according to the transmission preference, when the particular data set does not represent the complete data set: and transmitting a confirmation to the second computing device, when the particular data does represent the complete data set.

9. The method of claim 8, further comprising the step of providing preference information including memory availability as part of the client profile.

10. The method of claim 8, further comprising the step of providing preference information including client processing speed as part of the client profile.

11. The method of claim 8, further comprising the step of providing preference information including communication link speed as part of the client profile.

12. The method of claim 8, further comprising the step of providing preference information including an urgency indicator as part of the client profile.

13. The method of claim 8, wherein the step of receiving a message includes the step of receiving a message including client profile information.

* * * * *